Patented Mar. 4, 1930

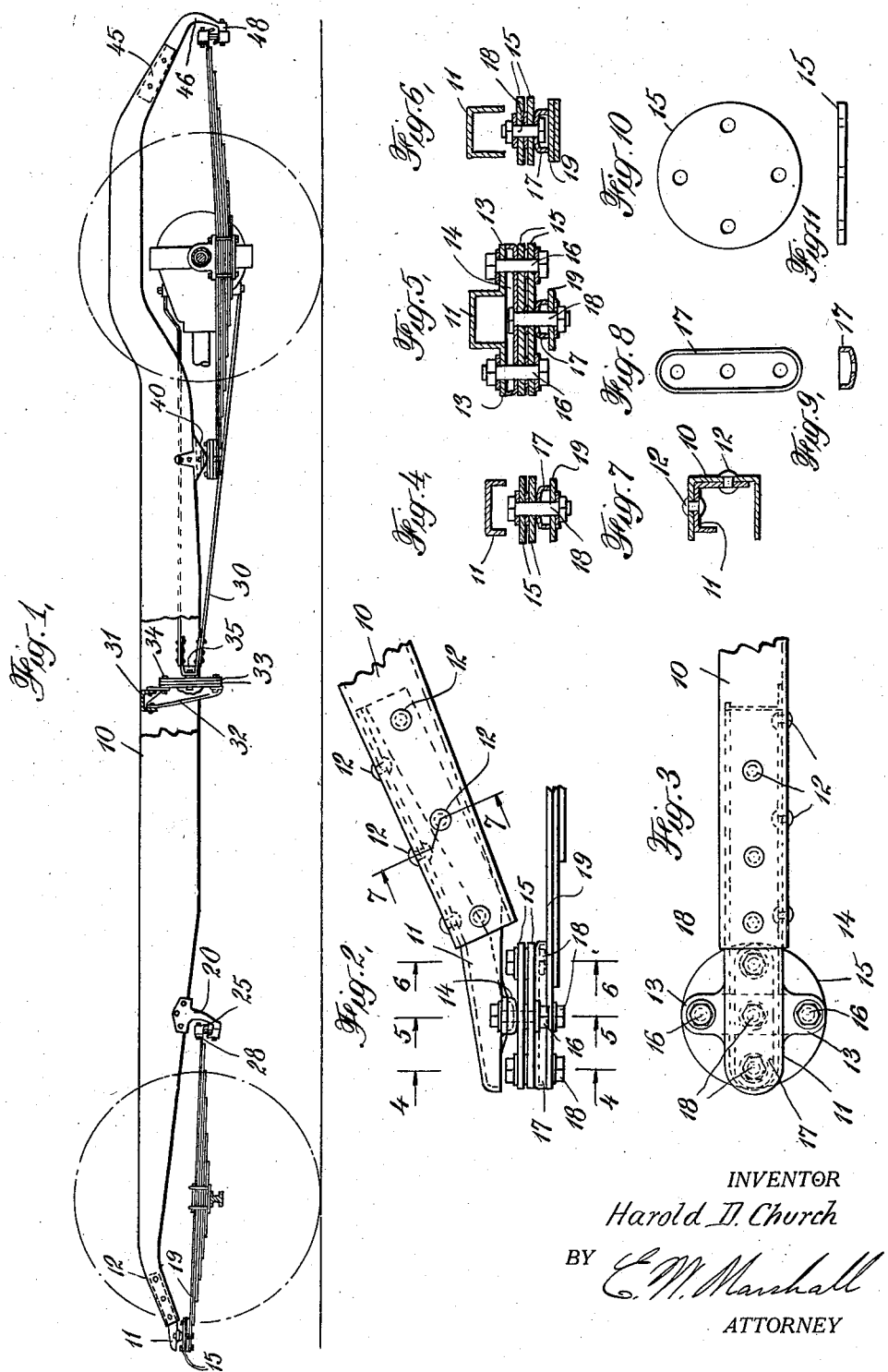

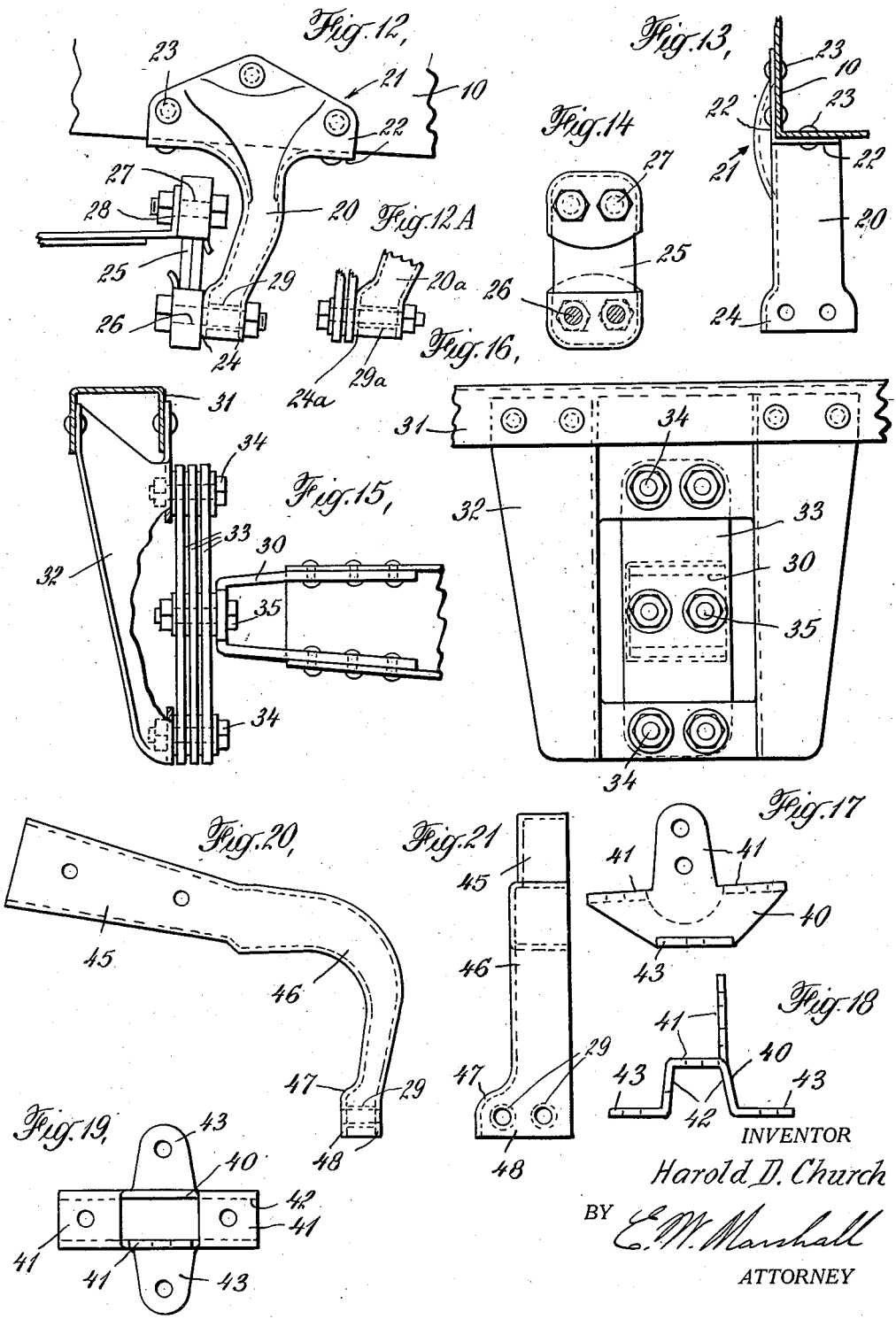

1,748,974

UNITED STATES PATENT OFFICE

HAROLD D. CHURCH, OF FAIRFIELD, CONNECTICUT, ASSIGNOR TO THE BELFLEX CORPORATION, OF NEW YORK, N. Y., A CORPORATION OF DELAWARE

BRACKET

Application filed May 11, 1923, Serial No. 638,171, and in Canada June 11, 1924.

This invention relates to brackets particularly adapted for connecting vehicle springs or other vehicle parts to the frame of the vehicle.

The invention has for its salient object to provide a bracket that is light in weight but rugged in construction and is well adapted to perform the functions for which it is designed.

Another object of the invention is to provide a bracket that is neat in appearance and can be economically manufactured.

Further objects of the invention will appear from the following specification taken in connection with the drawings, which form a part of this application, and in which Fig. 1 is an elevational view partly in section of a motor vehicle chassis showing a plurality of brackets constructed in accordance with the invention.

Fig. 2 is an enlarged elevational view showing the bracket connection between the front end of the vehicle frame and the front end of the front vehicle spring.

Fig. 3 is a top plan view of the structure shown in Fig. 2.

Figs. 4, 5, 6 and 7 are sectional elevations taken respectively on lines 4—4, 5—5, 6—6 and 7—7 of Fig. 2.

Fig. 8 is a top plan view of one end of the clamping plates used in connection with the bracket shown in Figs. 2 to 6 inclusive.

Fig. 9 is a transverse sectional elevation of the clamping plate shown in Fig. 8.

Fig. 10 is a top plan view of one of the flexible disks used in the connection shown in Figs. 2 to 6 inclusive.

Fig. 11 is an elevational view of the disk shown in Fig. 10.

Fig. 12 is an enlarged elevational view showing the bracket connection between the rear end of the front vehicle spring and the vehicle frame.

Fig. 12A is a fragmentary detail elevation of the bracket and connection shown in Fig. 12 but showing the shackle clamped directly to the bracket.

Fig. 13 is a sectional elevation taken at right angles to Fig. 12.

Fig. 14 is an elevational view of the flexible shackle used in connection with the bracket shown in Figs. 12 and 13.

Fig. 15 is an enlarged elevational view partly in section showing the bracket connection between the front end of the torque arm and the vehicle frame.

Fig. 16 is an elevational view taken at right angles to Fig. 15.

Figs. 17, 18 and 19 are elevational views showing the bracket used for connecting the front end of the rear spring of the vehicle frame, these views being taken at right angles to each other, and Figs. 20 and 21 are elevational views taken at right angles to each other and showing the bracket used for connecting the rear end of the vehicle frame with the rear end of the rear spring.

The invention briefly described consists of a bracket, preferably of stamped metal and channeled in section. One end portion of the bracket is adapted to be secured to the vehicle frame and in certain embodiments of the invention this end portion comprises a pair of plates disposed at right angles to each other. In another form of the invention, such as that used for securing the rear end of the rear spring to the vehicle frame, the upper end portion is channeled and adapted to fit within the channel of the frame. The other end portions of the brackets are provided with flat faces adapted to be secured to the spring shackle or other part. The channeled section of the bracket increases the strength and also provides a bracket having a neat appearance. Further details of the invention will appear from the following description.

In Fig. 1 there is shown a frame 10 of a vehicle chassis and this frame is channeled throughout its length.

The bracket about to be described was designed particularly for connecting vehicle springs to the frame of the vehicle chassis and in the form of the invention shown in Figs. 2 to 7 inclusive a bracket 11 is channeled in section as shown particularly in Fig. 7. This bracket is adapted to fit within the channel of the frame 10 and is secured thereto by rivets 12 or other suitable securing means.

The lower end of the bracket 11 has formed thereon spaced flanges or flat surfaces 13. The spring shackle is secured to these flanges 13 in the manner shown in Figs. 3, 4, 5 and 6 and in the particular form of the invention illustrated the shackle comprises a plate 14 and a pair of flexible disks 15 which are clamped to the flanges 13 by means of bolts 16. A plate 17 is clamped to the plate 14 and to the disks by means of bolts 18, this plate being disposed at right angles to the plate 14. The bolts 18 also pass through a leaf 19 of the front vehicle spring.

The connection for the rear end of the front spring is shown in detail in Figs. 12 and 13. This connection comprises a bracket 20 having an upper end 21 angular in section and comprising a pair of plates 22 disposed substantially at right angles to each other. These plates are adapted to be secured by rivets or other suitable securing means 23 to the side and bottom of the channeled frame member 10. The intermediate portion of the bracket 20 is channeled in section and the lower end 24 comprises substantially parallel flat surfaces. The spring shackle 25 is bolted by means of bolts 26 to the lower end 24 of the bracket and the opposite end of the shackle is secured by bolts 27 to an angularly disposed end 28 of one of the spring leaves. Sleeves 29 are preferably inserted between the flat surfaces of the end 24 of the bracket and the bolts 26 extend through these sleeves. The fabric strips of the shackle can if desired be bolted directly against the lower end 24ª of the bracket 20ª, as shown in Fig. 12A.

In Figs. 15 and 16 there is illustrated a bracket 32 used for connecting a torque arm 30 to a cross frame member 31, this last frame member being secured at its end to the longitudinal frame members 10. The torque arm bracket 32 is channeled in section and has secured to one of its faces a plurality of flexible strips 33, these strips being rigidly clamped to the bracket by bolts 34. Intermediate the bolt connections 34, the strips 33 are secured by bolts 35 to the front end of the torque arm 30, this connection being disposed substantially at right angles to the bolt connection 34.

In Figs. 17, 18 and 19 there is illustrated a bracket used for connecting the front end of the vehicle spring to the vehicle frame. This bracket 40 has angularly disposed portions 41 adapted to be secured to the frame 10 in a manner similar to the bracket 20 and is channeled at 42 and is provided at its lower end with laterally extending flanges 43 which are clamped to the spring shackle in a manner similar to the flanges 13 of the bracket 11.

The bracket for connecting the rear end of the vehicle frame to the rear end of the rear spring is illustrated in detail in Figs. 20 and 21. This bracket is channeled throughout its length and has an upper portion 45 adapted to fit within the channeled rear portion of the frame 10 and attention is called to the fact that the portion 45 of the bracket is tapered longitudinally in a manner corresponding to the taper of the rear end of the frame 10. The intermediate portion of this bracket is curved as shown at 46 and the bottom end 47 is provided with substantially parallel portions 48 to which the lower end of the spring shackle is clamped in a manner similar to the connection between the spring shackle 25 and the bracket 20. Sleeves 29 are inserted between the portion 48 of the bracket, as in the form of the invention shown in Fig. 12.

In connection with the foregoing description it will be noted that all of the brackets described are channeled and are formed of stamped metal. Each of the brackets also has one portion or one end adapted to be secured to the frame and the other end adapted to be secured to the vehicle spring or other vehicle part such as the torque arm. It will be evident that the brackets can be economically manufactured and because of their channeled construction they will be strong and rigid.

Although certain specific embodiments of the invention have been particularly shown and described, it will be understood that the invention is capable of further modification and further changes in the construction and in the arrangement of the various parts may be made without departing from the spirit or scope of the invention as expressed in the following claims.

What I claim is:

1. A stamped metal bracket having an angular end portion for attachment to a vehicle frame, a channeled intermediate portion and a channeled end portion having a substantially flat clamping face at right angles to the longitudinal axis of the frame.

2. A unitary stamped metal bracket having an angular end portion for attachment to a vehicle frame, one face of said angular end portion being shaped to engage under said frame and the other face of said portion being shaped to engage the side surface of said frame, said bracket further comprising a channeled intermediate portion and an end portion having a substantially flat clamping face.

3. A stamped metal bracket having one end formed right angular in section, one face of said angular end portion being shaped to engage under said frame and the other face of said portion being shaped to engage the side surface of said frame, said bracket further comprising a channeled intermediate portion, the other end of said brackets extending clear of the frame and being channeled and having substantially flat parallel faces.

4. In combination, a vehicle frame, a vehicle spring, a stamped metal bracket connected to the frame, said bracket being shaped to provide a flat surface at right angles to the longitudinal axis of the frame, and a flexible shackle rigidly secured to the spring and to the said surface of said bracket.

5. A stamped metal bracket for attachment to a vehicle frame, comprising an end portion for attaching the said bracket to the said vehicle frame, an intermediate channeled portion, and another channeled end portion having a flat surface at right angles to the longitudinal axis of said frame for receiving a flat-faced shackle thereon.

6. In combination, a vehicle frame, a vehicle spring, a stamped metal bracket attached to the said frame, the free end of said bracket having a flat surface substantially perpendicular to the longitudinal axis of the said frame, and a flat-faced flexible shackle rigidly secured to the said spring and to the said flat surface of the bracket.

7. In a motor vehicle, the combination with a channeled frame member, of a channeled spring hanger bracket secured thereto and projecting therebeyond, said hanger being provided with a flat clamping face for the securement thereto of a spring shackle.

In witness whereof, I have hereunto set my hand this 20th day of March, 1923.

HAROLD D. CHURCH.